United States Patent
Sato

(10) Patent No.: US 6,753,986 B1
(45) Date of Patent: Jun. 22, 2004

(54) IMAGE READING DEVICE AND ELECTRONIC WHITEBOARD INCLUDING THE SAME

(75) Inventor: Tatsuya Sato, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 634 days.

(21) Appl. No.: 09/705,863

(22) Filed: Nov. 6, 2000

(30) Foreign Application Priority Data

Nov. 5, 1999 (JP) .......................................... 11-314469

(51) Int. Cl.[7] ................................................. H04N 1/04
(52) U.S. Cl. ...................... 358/505; 358/474; 358/475; 358/468
(58) Field of Search ................................ 358/505, 474, 358/501, 400, 483, 475, 509, 468, 486

(56) References Cited

U.S. PATENT DOCUMENTS 4,789,872 A * 12/1988 Hosoi ........................... 346/76

FOREIGN PATENT DOCUMENTS

JP          1-184197         7/1989     ............. B43L/1/64

* cited by examiner

Primary Examiner—Kimberly Williams
Assistant Examiner—Negussie Worku
(74) Attorney, Agent, or Firm—Oliff & Berridge, PLC

(57) ABSTRACT

An image reading device includes a contact image sensor (CIS), red and green LEDs which are, in turn, turned on, and an image data output device that outputs images written in red and black on a writing surface, as image data, by identifying the colors of the images, based on image data read by the CIS, when the red LED is turned on, and the image data read by the CIS when the green LED is turned on. In the image reading device, the image reading is performed by losing the image data detected while being influenced by light from both the red LED and the green LED. The multi-color images are read while colors of the images are precisely identified. Further, the image reading speed is increased.

20 Claims, 13 Drawing Sheets

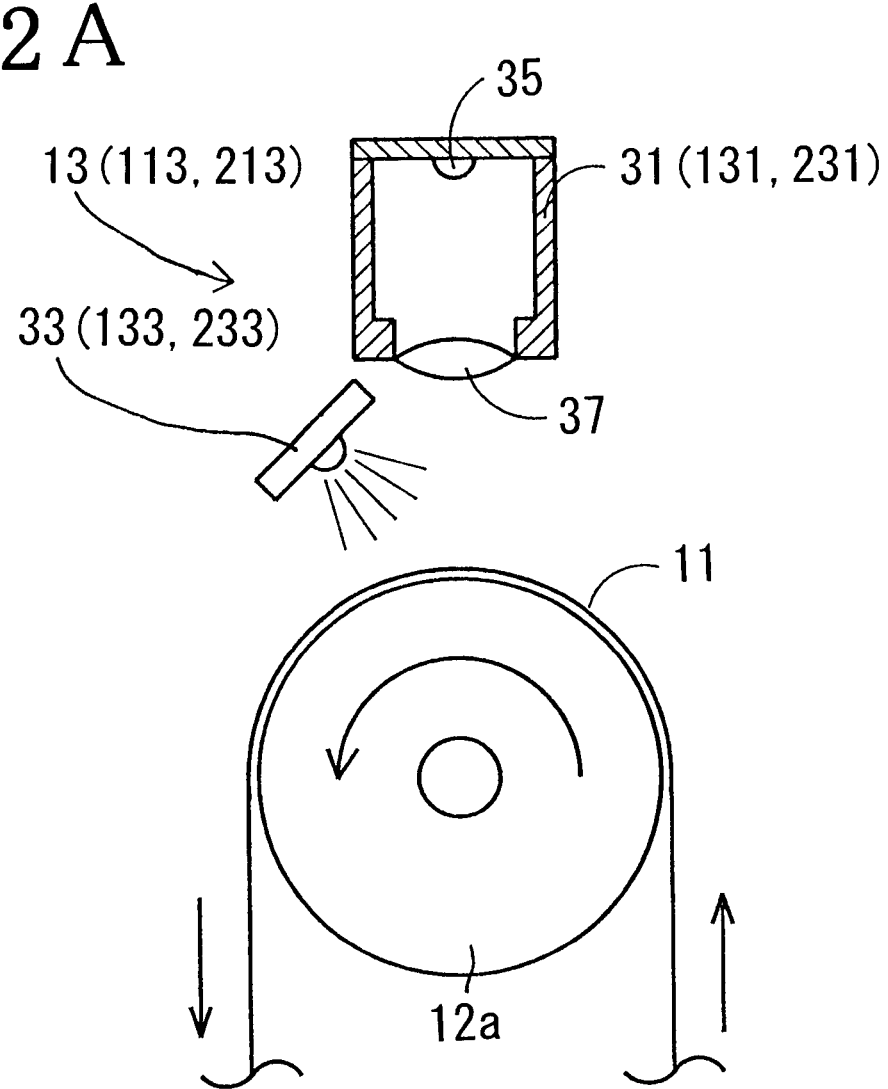

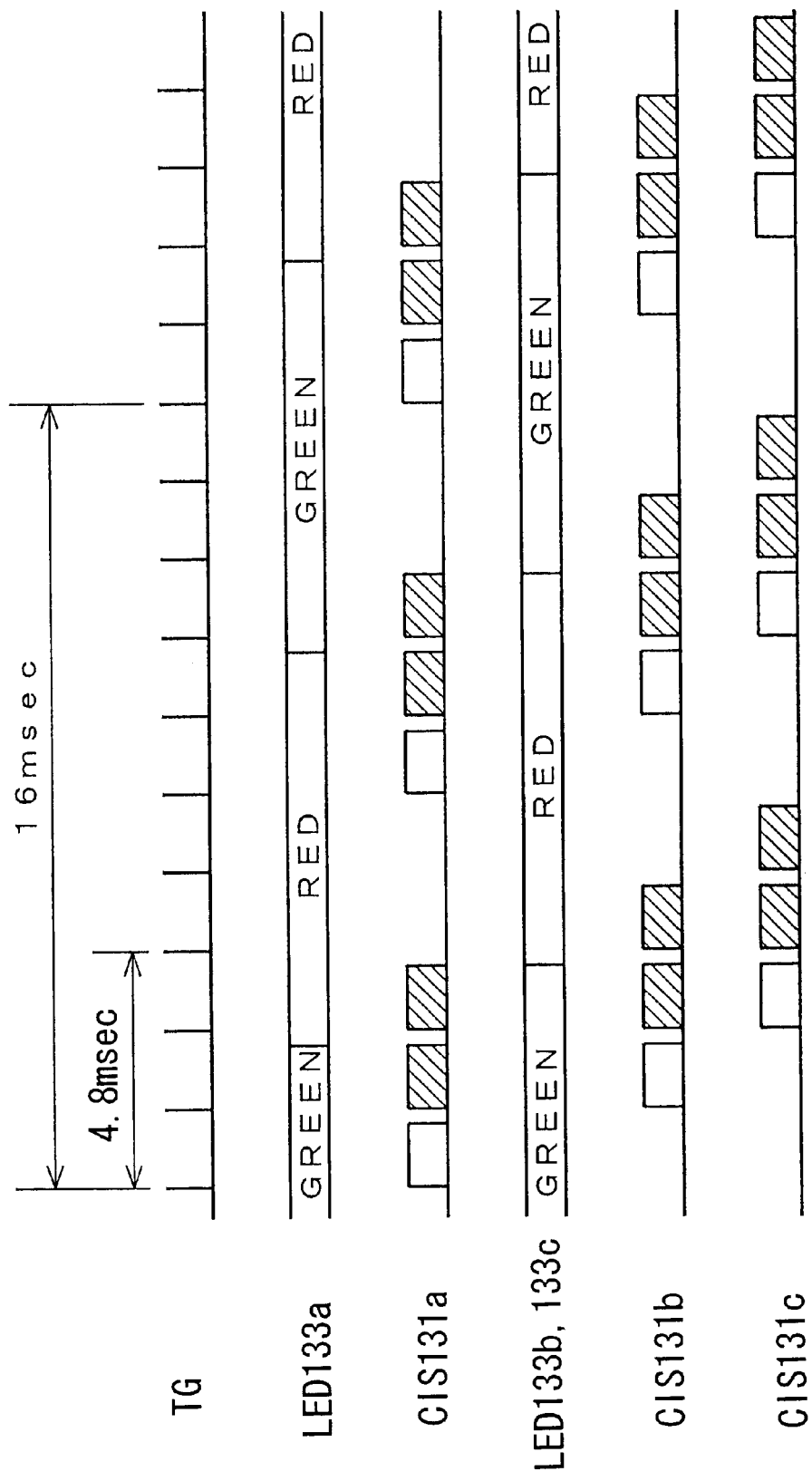

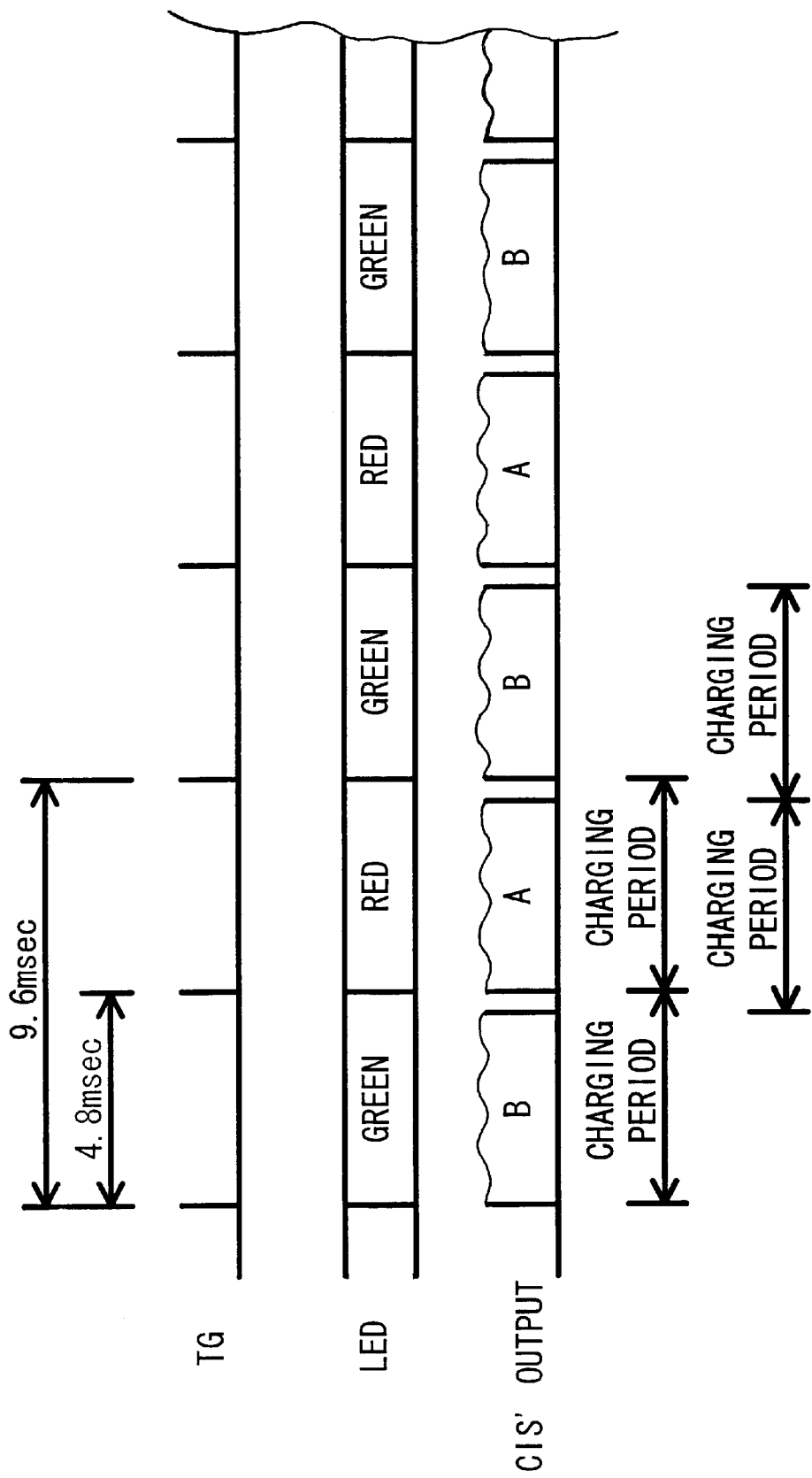

IMAGE READING DEVICE AND ELECTRONIC WHITEBOARD INCLUDING THE SAME

BACKGROUND OF THE INVENTION

1. Field of Invention

The invention relates generally to an image reading device and an electronic whiteboard including the image reading device and, more particularly, to the image reading device and the electronic whiteboard capable of reading data of images written in at least two colors.

2. Description of Related Art

A known electronic whiteboard electrically reads images, such as text/graphics written on a whiteboard or a movable sheet, and records the read images on a recording medium. More specifically, the text/graphics written on the whiteboard or the movable sheet are read by a charge coupled device (CCD). Thereafter, print data for the text/images is created and printed by a thermal printer on the recording medium, such as heat-sensitive paper.

Recently developed is a multi-color electronic whiteboard that reads multi-color images written on a whiteboard or a movable sheet and may perform multi-color printing. Such multi-color electronic whiteboards are disclosed in U.S. Pat. No. 4,789,872 and Japanese Unexamined Patent Publication No. 1-184197.

However, a CCD that employs a fluorescent lamp has some problems, such as the light amount of the fluorescent lamp is unstable, due to the temperature characteristics of the lamp, and the operating life of the lamp is relatively short. In addition, an image reading device included in the electronic whiteboard tends to become large in size, to ensure an optical path to the CCD. Consequently, the size of the electronic whiteboard becomes larger.

The applicant of the invention described later herein has created devices having a multi-color image reading device and a prototype electronic whiteboard that uses a light-emitting diode (LED) and a contact image sensor (CIS), to ensure the stable light amounts for a long time as well as to reduce the size of the image reading device.

The prototype electronic whiteboard includes a whiteboard, a CIS, provided with photo detectors corresponding to the number of pixels, to read images written on the whiteboard, and a red LED and a green LED that emit red light and green light, respectively, to reading positions of the images written on the whiteboard. As shown in FIG. 11, the red LED and the green LED of the prototype electronic whiteboard are, by turns, switched on. The images written in red and black on the prototype electronic whiteboard are stored, as image data in which the colors of the images are identified, based on a first image data A and a second image data B read by the CIS during the emission of the red and green light. Finally, by applying heat, based on the stored image data, to multi-color heat-sensitive paper, which may color in red and black, according amounts of heat applied thereto, the images written on the prototype electronic whiteboard are reproduced on the multi-color heat-sensitive paper.

The CIS, used in the prototype electronic whiteboard, has a charging period of 4.8 msec, as shown in FIG. 11. The CIS is provided with photo detectors corresponding to the number of pixels. Each of the photo detectors requires 4.8 msec to store enough electrical charge, to ensure effective image data, by receiving light. In the CIS, as the photo detector, corresponding to the first pixel, receives the light and stores enough electrical charge to ensure the effective image data, the image data of the first pixel in one line is output by discharging the electrical charge. Typically, the electrical charge is discharged, in turn, from the first photo detector to the last one, for all pixels, after the charging periods thereof After the electrical charge is discharged from the last photo detector, the electrical charge is discharged again from the first photo detector which has stored the electrical charge during the charging period. The charging period is the time during which enough electrical charge is stored to ensure effective image data after a photo detector starts to receive the light. The charging period of the CIS is determined according to the characteristics thereof.

The CIS may discharge the electrical charge even when each of the photo detectors does not store enough electrical charge. It is possible to discharge the stored electrical charge from each of the photo detectors before the charging period elapses. In this case, each of the photo detectors has not yet stored enough electrical charge to ensure effective image data.

However, the image reading device, which is included in the prototype electronic whiteboard, has the following drawbacks. When the CIS having a charging period of 4.8 msec is used, timing pulses TG are output to the CIS at intervals of 4.8 msec, as shown in FIG. 11. The images written on the whiteboard are read by the CIS, while red and green light is, by turns, emitted from the red and green LEDs, respectively. However, the outputs produced by the CIS are affected by both the red and green light, due to the charging periods of the photo detectors corresponding to the number of pixels. Consequently, the images written in red and black on the prototype electronic whiteboard cannot be precisely identified. The problems encountered in the prototype electronic whiteboard led to the invention described below.

SUMMARY OF THE INVENTION

Accordingly, one aspect of the invention is to provide a multi-color image reading device employing a contact image sensor (CIS), that precisely identifies multi-color images written on a whiteboard.

Another aspect of the invention is to provide a multi-color image reading device employing a CIS, that precisely identifies multi-color images written on a whiteboard and that reads the images as fast as possible.

According to one aspect of the invention, an image reading device of the invention that reads an image written in at least two colors on a writing surface, by identifying the colors of the image, may include a contact image sensor provided with photo detectors corresponding to a number of pixels, for reading the image written on the writing surface, the contact image sensor having a predetermined charging period; a first light-emitting device that emits a first color of light at an image reading position on the writing surface; a second light-emitting device that emits at an image reading position on the writing surface, a second color of light different from the first color of light; an image data output device that outputs the image written on the writing surface, as image data, by identifying the colors of the image, based on the image data read by the contact image sensor, while the first light-emitting device and the second light-emitting device, are in turn, turned on; and an image reading control device that operates the image data output device, so as to lose a first image data and to adopt a second image data, when each of the photo detectors of the contact image sensor reads the image as the image data by storing an electrical charge while either one of the first light-emitting device and the second light-emitting device emits light corresponding the first color of light or the second color of light.

In the image reading device of the invention, the image reading control device operates the image data output device, so as to lose the first image data and to adopt the second image data, when each of the photo detectors of the contact image sensor reads the image as the image data by storing the electrical charge while either one of the first light-emitting device and the second light-emitting device emits light corresponding to the first color of light or the second color of light. Consequently, the image written in at least two colors on the recording medium may be read while colors of the image are precisely identified.

According to another aspect of the invention, an image reading device of the invention that reads an image written in at least two colors on the recording medium, by identifying the colors of the image, may include a contact image sensor provided with photo detectors corresponding to a number of pixels, for reading the image written on the writing surface, the contact image sensor being divided into a plurality of parts in a direction of a length thereof, the contact image sensor having a predetermined charging period; a first light-emitting device that emits a first color of light, at an image reading position on the writing surface, the first light-emitting device being divided into a plurality of parts in a direction of a length thereof; a second light-emitting device that emits a second color of light at an image reading position on the writing surface, the second light-emitting device being divided into a plurality of parts in a direction of a length thereof; an image data output device that outputs the image written on the writing surface, as image data, by identifying the colors of the image, based on a first image data started to be read by the contact image sensor, during emission of the first color of light from the first light-emitting device, and a second image data started to be read by the contact image sensor, during emission of the second color of light from the second light-emitting device, as the first light-emitting device and the second light-emitting device are by turns, turned on; and an image reading control device that operates the plurality of parts of the contact image sensor, in a predetermined order, and operates the plurality of parts of the contact image sensor so as to lose the image data which is output, while each of the plurality of parts of the contact image sensor performs an effective reading, by other parts of the contact image sensor. The image reading control device executes a reading of the image written on the writing surface by overlapping periods of image reading by each of the plurality of parts of the contact image sensor.

In the image reading device of the invention, the contact image sensor, the first light-emitting device, and the second light-emitting device are divided into parts. The image reading control device operates the plurality of parts of the contact image sensor in a predetermined order. The image reading control device operates the plurality of parts of the contact image sensor, so as to lose the image data which is output while each of the plurality of parts of the contact image sensor performs an effective reading by other parts of the contact image sensor. Further, the image reading control device executes a reading of the image written on the recording medium by overlapping periods of image reading by each of the plurality of parts of the contact image sensor. Consequently, the image written in at least two colors on the writing surface may be read while colors of the image are precisely identified. In addition, the image reading speed is increased.

BRIEF DESCRIPTION OF THE DRAWINGS

Preferred embodiments of the invention will be described in detail with reference to the following figures wherein:

FIG. 2A is a schematic illustration of a contact image sensor unit in an electronic whiteboard according to an embodiment of the invention;

FIG. 6 is a timing chart illustrating image reading control operations to be performed in the electronic whiteboard according to the second embodiment of the invention;

FIG. 11 is a timing chart illustrating image reading control operations performed in the related art.

Further objects, details, and advantages of the invention will be apparent from the following detailed description, when read in conjunction with the drawings.

DETAILED DESCRIPTION OF PREFERRED EMBODIMENTS

Preferred embodiments of the invention will be described in detail with reference to the accompanying drawings. A first embodiment of an electronic whiteboard provided with a multi-color thermal printer that produces a print output of text or graphics written in black and red, by identifying colors thereof, will be described.

Figure 1:
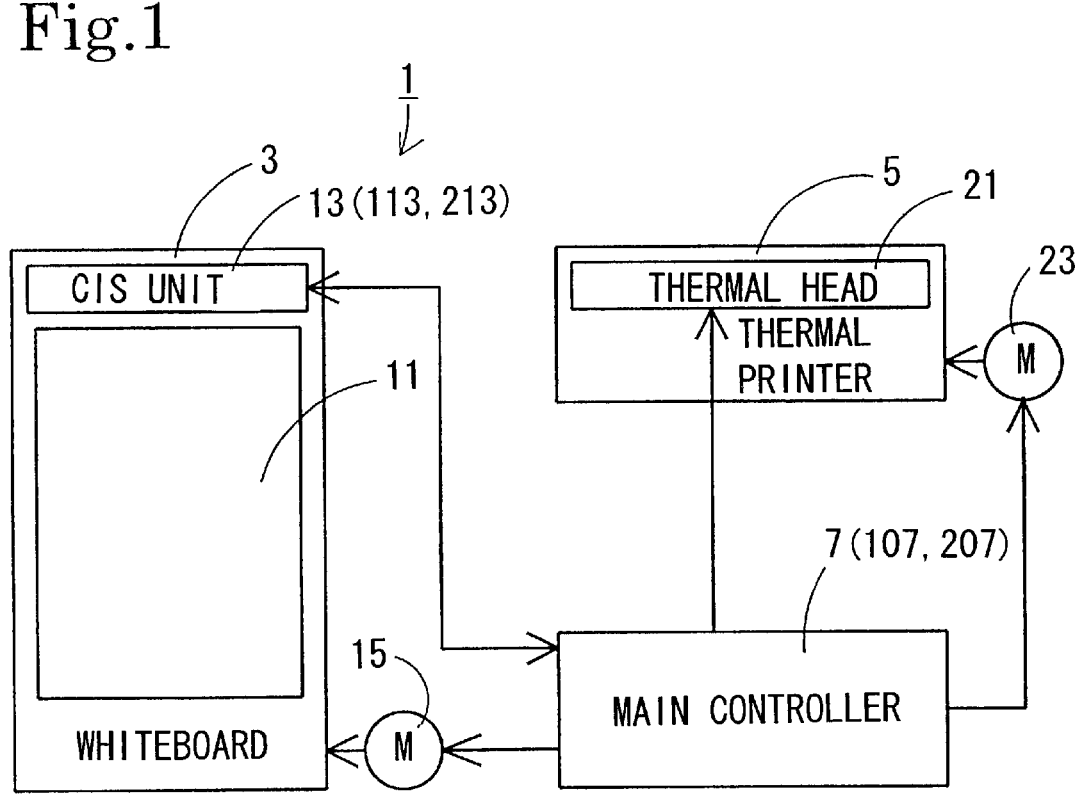
FIG. 1 is a block diagram of an electronic whiteboard, according to an embodiment of the invention.

As shown in FIG. 1, an electronic whiteboard 1, according to the first embodiment of the invention, includes a whiteboard 3, a thermal printer 5, and a main controller 7 that controls the whiteboard 3 and the thermal printer 5. The whiteboard 3 includes a sheet member 11 on which text or graphics are written, a CIS unit 13 that reads the text or graphics written on the sheet member 11 and outputs image data thereof, and a sheet member feed motor 15 that feeds the sheet member 11 in upward and downward directions. The thermal printer 5 includes a thermal head 21 provided with heating elements, corresponding to the number of pixels, which are arranged in an array in the direction of the width of the multi-color heat-sensitive paper, and a paper feed motor 23 that feeds the multi-color heat-sensitive paper.

Figure 2B:
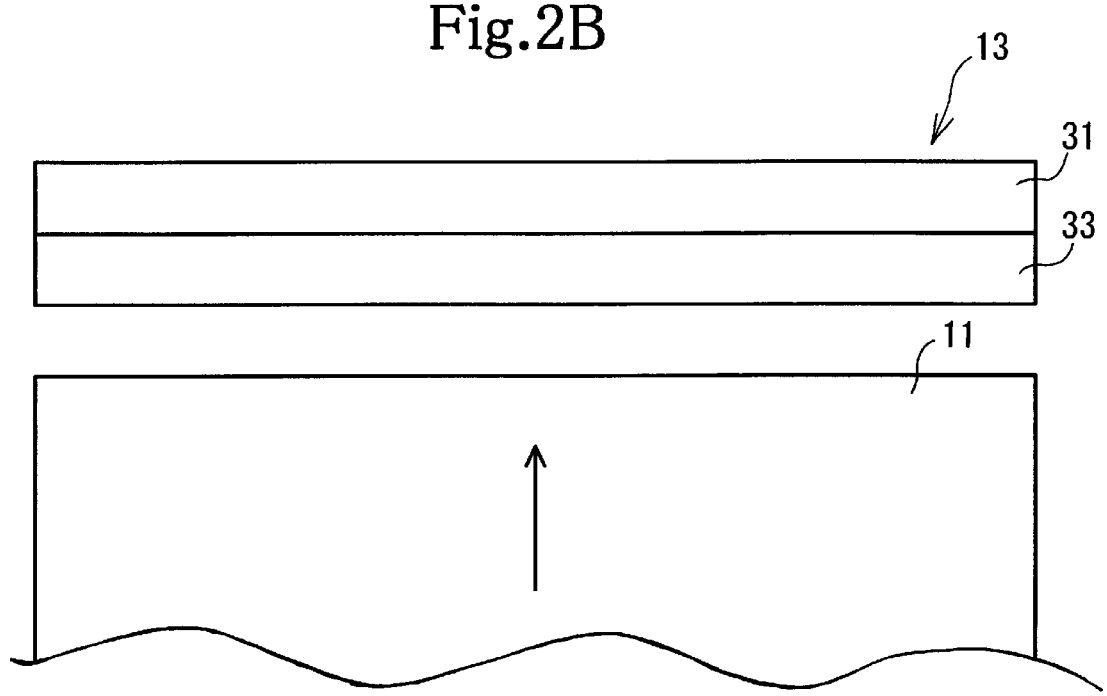
FIG. 2B is a schematic illustration of a contact image sensor unit in an electronic whiteboard according to a first embodiment of the invention.

The sheet member 11, like an endless belt, forms front and rear side writing panels. The sheet member 11 is supported by upper and lower feed rollers provided for the whiteboard 3. Only the upper feed roller 12a is shown in FIG. 2A. As shown in FIG. 2A, the CIS unit 13 includes a CIS 31 and a LED 33. The CIS 31 includes photo detectors 35 and lens 37 corresponding to the number of pixels. The photo detectors 35 and the lens 37 have a one-to-one relationship. The LED 33 is constructed to emit red light and green light. The CIS unit 13 is constructed to read only text/graphics written in black on the sheet member 11 while the red LED is turned on, and to read text/graphics written in black and red on the sheet member 11 while the green LED is turned on. When the red light irradiates the text/graphics written in black and red, the red light is not reflected off a portion written in black. Thus, the CIS 31 reads the portion of the text/graphics that is written in black. When the green light irradiates the text/graphics written in black and red, the light is not reflected off portions written in black and red. Thus, the CIS 31 reads those portions of the text/graphics that are written in black and red.

Figure 2C:
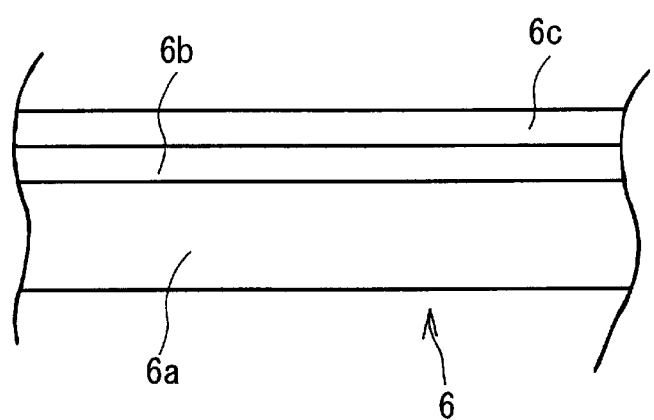
FIG. 2C is a partial sectional view of multi-color heat-sensitive paper.

As shown in FIG. 2C, the multi-color heat-sensitive paper 6, which is set to the thermal printer 5, has a layered construction. More specifically, the multi-color heat-sensitive paper 6 is formed with a recording sheet 6a, a first heat-sensitive ink layer 6b, and a second heat-sensitive ink layer 6c. The first heat-sensitive ink layer 6b is formed on the recording sheet 6a. The second heat-sensitive ink layer 6c is formed on the first heat-sensitive ink layer 6b. The first heat-sensitive ink layer 6b has red ink applied thereon and colors in red at a first temperature. The second heat-sensitive ink layer 6c has black ink applied thereon and colors in black at a second temperature, which is lower than the first temperature.

Figure 3:
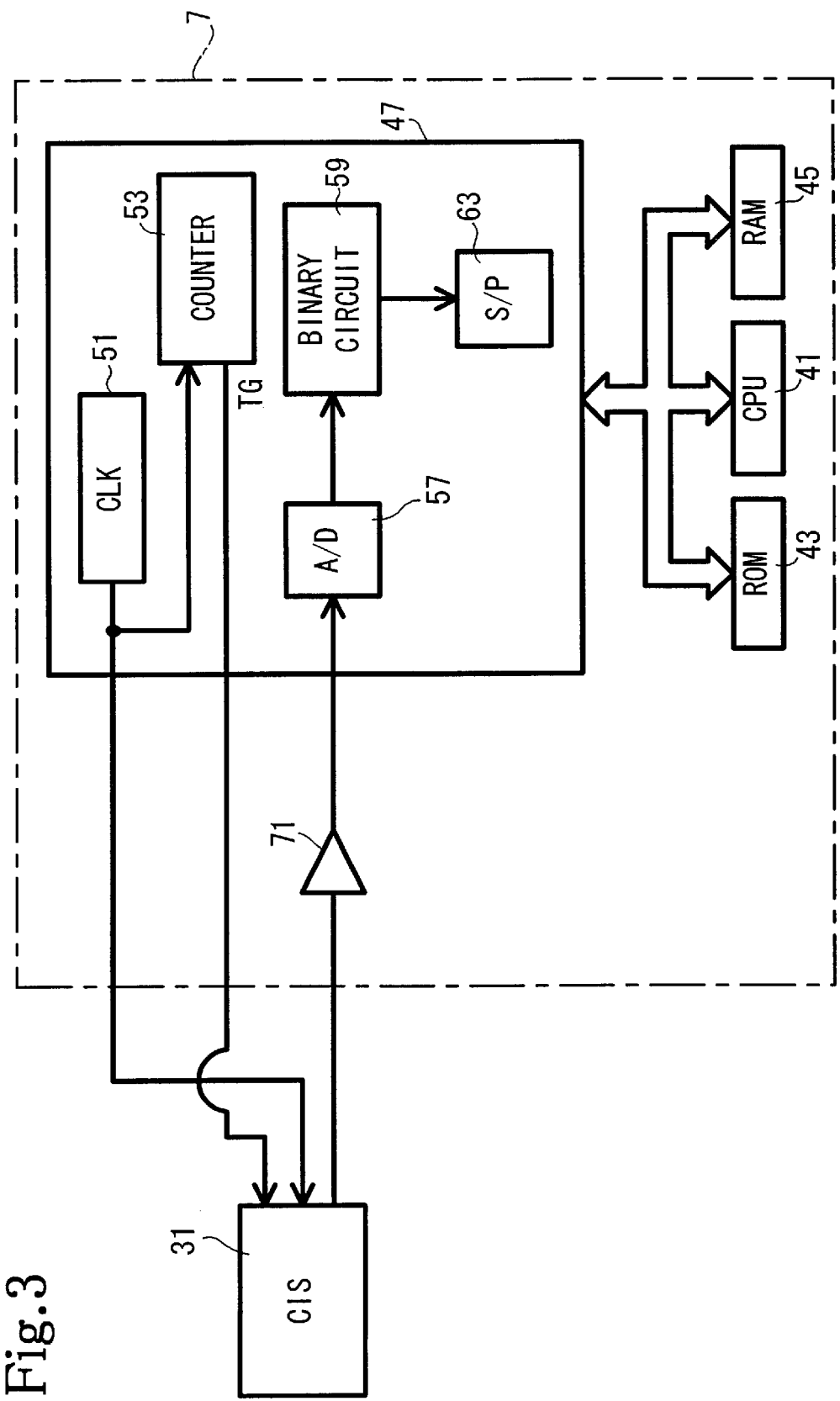
FIG. 3 is a block diagram of an input system for an image reading signal in the electronic whiteboard according to the first embodiment of the invention.

An input system of the main controller 7 will now be explained. As shown in FIG. 3, the input system of the main controller 7 includes a central processing unit (CPU) 41, a read-only memory (ROM) 43, a random-access memory (RAM) 45, and an application-specific integrated circuit (ASIC) 47.

The ASIC 47 includes a clock 51, a counter 53, an A/D (analog-to-digital) converter 57, a binary circuit 59, and a S/P (serial-to-parallel) converter 63. The clock 51 generates clock signals at intervals of 2 microseconds. The clock signals are input to the CIS 31, as well as the counter 53. The counter 53 provides timing pulses TG to the CIS 31 and the CPU 41. The counter 53 is constructed so as to repeat the operations of resetting every 2400 counts, kept in synchronization with the clock signals generated by the clock 51, and outputting the timing pulses TG. More specifically, the counter 53 outputs the timing pulses TG to the CIS 31 every 4.8 msec (2 microseconds×2400 counts). The A/D converter 57 converts analog signals, which are input from the CIS 31, into digital signals. The binary circuit 59 binary-codes the image data, based on the signals output from the A/D converter 57. The S/P converter 63 converts serial signals output from the binary circuit 59 into parallel signals, and outputs the converted signals to the CPU 41 via a bus.

The main controller 7 includes an amplifier 71. The amplifier 71 amplifies the signals detected by and output from the CIS 31.

Image reading control operations in the electronic whiteboard 1 will be described below. In the electronic whiteboard 1, as the counter 53 outputs a reset signal (the timing pulse TG), the CIS 31 is placed under a condition to detect signals. Image reading signals detected by each of the photo detectors of the CIS 31 are input into the A/D converter 57, of the ASIC 47, via the amplifier 71. In the A/D converter 57, analog to digital conversion is carried out. The converted data is input to the binary circuit 59. The data input to the binary circuit 59 is binary-coded in comparison with a predetermined threshold value. The binary-coded image reading signals are input to the S/P converter 63 in which the image reading signals are converted into parallel data. The effective parallel data (FIG. 4) is read by the CPU 41 and stored in the RAM 45. At this time, the ineffective parallel data (FIG. 4) output from the S/P converter 63 is not stored in the RAM 45 under the control of the CPU 41. Thus, the CPU 41 determines storage of the effective data and discards, loses, the ineffective data.

With the above-described control operations, the image reading signals detected by the CIS 31 are selectively stored in the RAM 45. One line of data of the images written on the sheet member 11 is stored in the RAM 45. At this time, the CPU 41 stores in the RAM 45 the results of judgements made based on a table, such as shown in TABLE 1 below, as to the colors of each pixel of the image data. More specifically, the judgements are made as to which color, black, red, or white, each pixel of the image data corresponds to, based on the color of LED light emitted when the image reading signal is obtained, and based on TABLE 1.

TABLE 1

| LED | | JUDGEMENT |
| --- | --- | --- |
| GREEN | RED | OF COLOR |
| WHITE | WHITE | WHITE |
| BLACK | WHITE | RED |
| BLACK | BLACK | BLACK |

Figure 4:
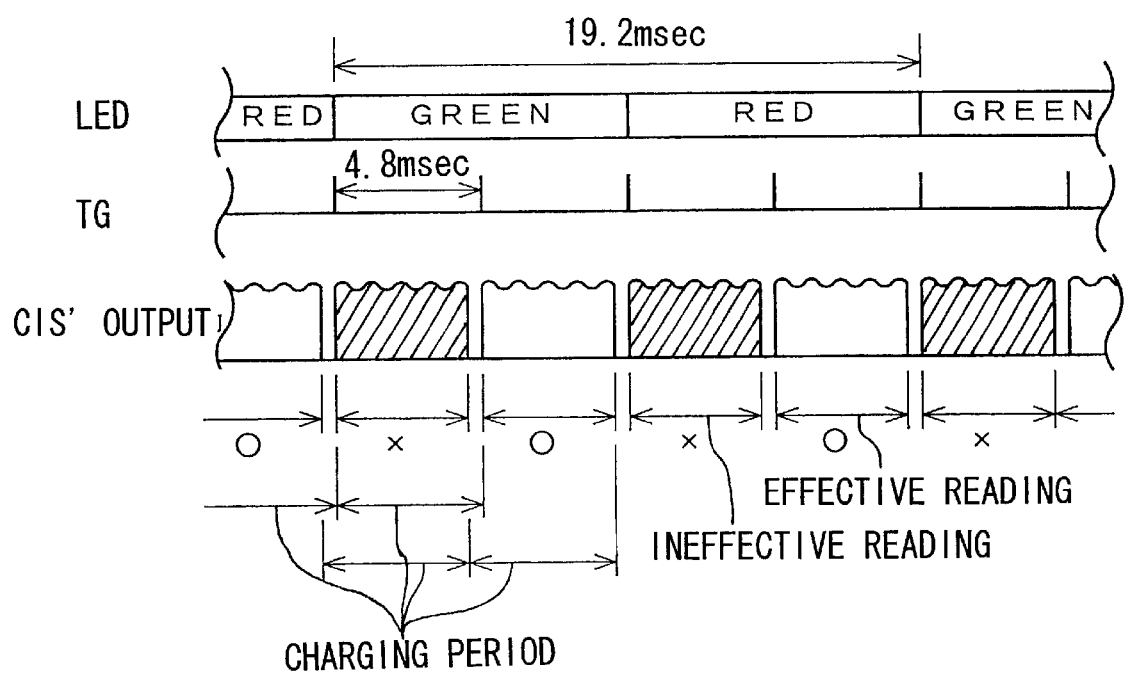
FIG. 4 is a timing chart illustrating image reading control operations to be performed in the electronic whiteboard according to the first embodiment of the invention.

Referring to the timing chart shown in FIG. 4, proceedings of the above-described control operations will be described below. The CPU 41 controls the LED 33 so as to switch the emission of the green light and the red light, approximately every 9.6 msec (corresponding to two timing pulse outputs). As described above, the CIS 31 has a charging period of 4.8 msec. That is, each of the photo detectors requires 4.8 msec to store enough electrical charge, to ensure effective image data, after starting to receive the light. The outputs from the CIS 31, which are represented by hatch portions in FIG. 4, are produced with each of the photo detectors storing the electrical charge, by receiving the light emitted approximately 4.8 msec before the outputs. Therefore, the CIS' outputs are affected by both the red light and the green light, so that the image data stored by each of the photo detectors does not precisely identify the images written in red and black on the sheet member 11. Consequently, the CIS' outputs represented by the hatched portions, are not used as the effective image data. The CIS' outputs, represented by the hatched portions, are lost without being stored in the RAM 45 by the CPU 41, after conversion into parallel data by the S/P converter 63.

The CIS' outputs represented by non-hatched portions, are also produced by each of the photo detectors storing the electrical charge, by receiving the light emitted approximately the 4.8 msec immediately before the outputs. However, each of the photo detectors receives either one of the red light or green light. Therefore, the image data stored by each photo detector will precisely identify the images written in red and black on the sheet member 11. Consequently, the CIS' outputs, represented by the non-hatched portions are preferably used as the effective image data. The CIS' outputs, represented by the non-hatched portions, are stored in the RAM 45 by the CPU 41 after conversion into parallel data by the S/P converter 63.

The CIS outputs, in turn, the image data to be lost and the image data to be stored. One line of the image data is read by emitting the red light and green light. In the first embodiment, the time required to read one line of the image data is approximately 19.2 msec.

In the first embodiment, the CIS' outputs which are affected by both the red light and green light are lost. The CIS' outputs which are produced by receiving either one of the red light or green light are input to the RAM 45 from the ASIC 47. Thus, the multi-color images may be precisely identified, according to the colors thereof.

A second embodiment of the invention will be described below. In the second embodiment, further improvements are seen than from the above-described first embodiment. The CIS having the charging period of 4.8 msec is used in the second embodiment and is similar to the CIS used in the first embodiment. However, the speed to read one line of image data is faster in the second embodiment than in the first embodiment.

Figure 7A:
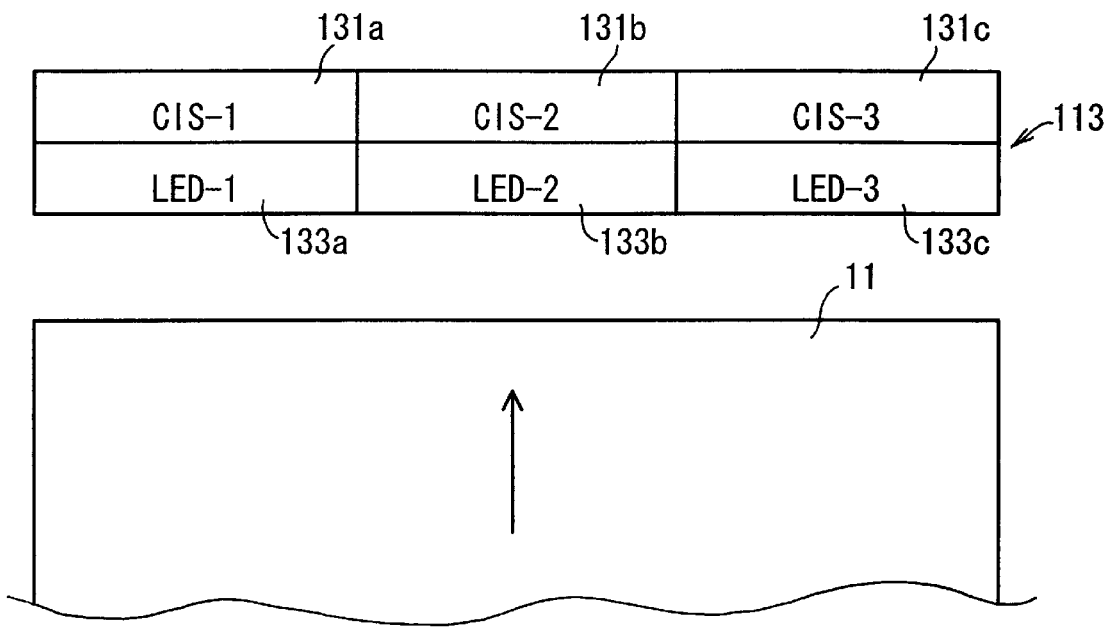
FIG. 7A is a schematic illustration of a contact image sensor unit in the electronic whiteboard according to the second embodiment of the invention.

A CIS unit 113 used in the second embodiment of the invention includes a CIS 131 and a LED 133 which are divided into three parts. Each of the divided parts of the CIS 131 has the charging period of 4.8 msec. More specifically, as shown in FIG. 7A, the CIS unit 113 is divided, in the direction of the length thereof, into three parts, that is, a CIS-1 131a (hereinafter referred to as the CIS 131a), a CIS-2 131b (hereinafter referred to as the CIS 131b), a CIS-3 31c (hereinafter referred to as the CIS 131c), a LED-1 133a (hereinafter referred to as the LED 133a), a LED-2 133b (hereinafter referred to as the LED 133b), and a LED-3 133c (hereinafter referred to as the LED 133c).

Figure 5:
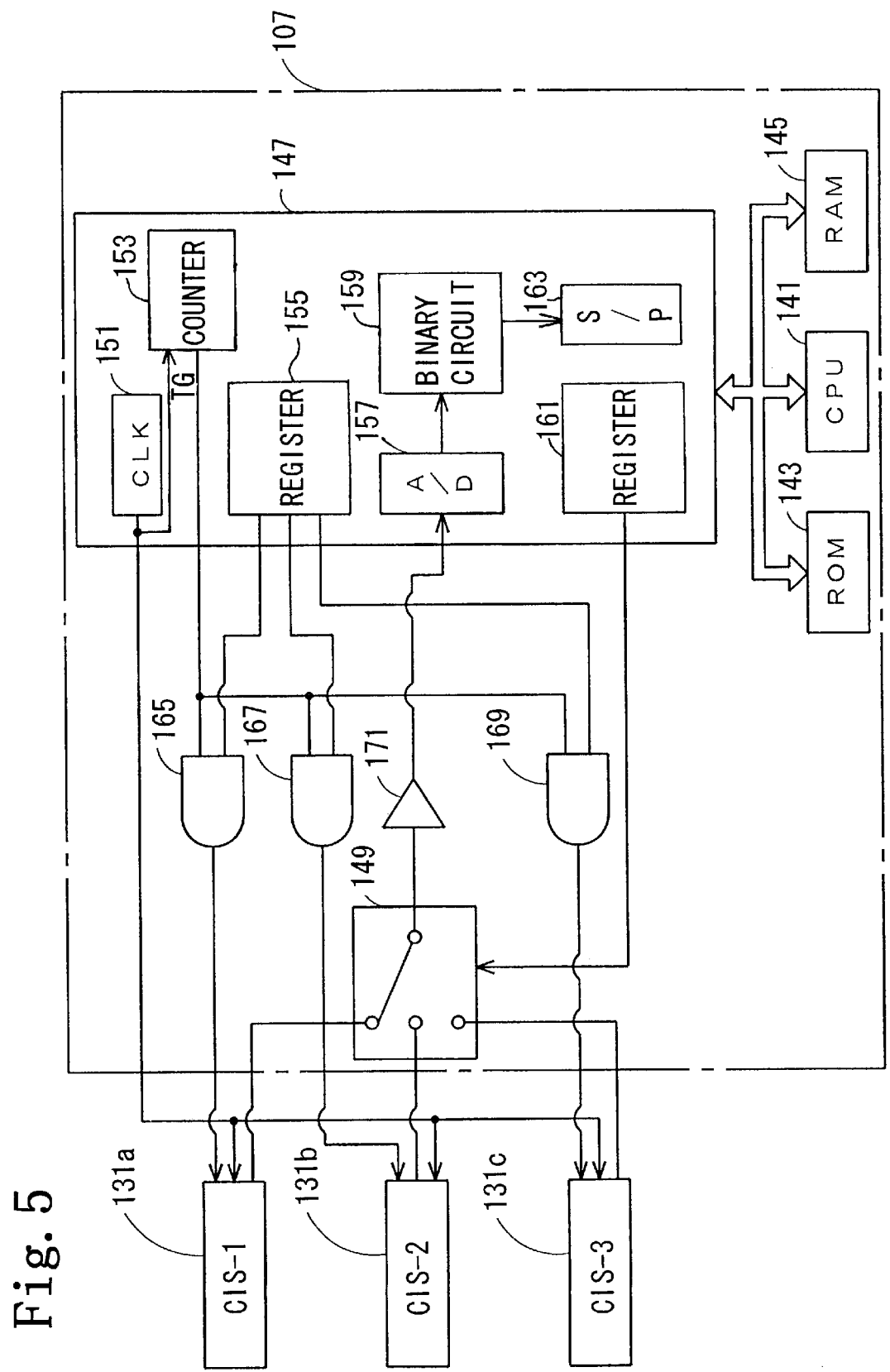
FIG. 5 is a block diagram of an input system for an image reading signal in an electronic whiteboard according to a second embodiment of the invention.

An input system of the main controller 107 will be explained below. As shown in FIG. 5, the input system of the main controller 107 includes a CPU 141, a ROM 143, a RAM 145, an ASIC 147, and a selector switch 149 that switches signals detected by and output from the CIS' 131a, 131b, 131c.

The ASIC 147 includes a clock 151, a counter 153, a first register 155, an A/D (analog-to-digital) converter 157, a binary circuit 159, a second register 161, and a S/P (serial-to-parallel) converter 163. The clock 151 generates clock signals at intervals of 2 microseconds. The clock signals are input to the CIS' 131a . 131c as well as the counter 153. The counter 153 provides timing pulses TG to the CIS' 131a, 131b, and 131c, and the CPU 141. The counter 153 is constructed so as to repeat the operations of resetting every 800 counts, kept in synchronization with the clock signals generated by the clock 151, and outputting the timing pulses TG. More specifically, the counter 153 outputs the timing pulses TG, every 1.6 msec (2 microseconds×800 counts), to a first AND circuit 165, a second AND circuit 167, and a third AND circuit 169, which will be described below. The first register 155 has three ports. The first register 155 outputs a control signal to determine which CIS' 131a, 131b, 131c can detect signals. The A/D converter 157 converts analog signals, which are input from the CIS' 131a, 131b, and 131c via the selector switch 149, into digital signals. The binary circuit 159 binary-codes the image data, based on the signals output from the A/D converter 157. The second register 161 is a port to provide switching timing to the selector switch 149 every approximately 1.6 msec, which is substantially the same interval at which the timing pulses TG are output. The switching timing is provided by the CPU 141. The S/P converter 163 converts serial signals, output from the binary circuit 159, into parallel signals and outputs the converted signals to the CPU 141 via a bus.

The main controller 107, the first AND circuit 165, the second AND circuit 167, the third AND circuit 169, and an amplifier 171. The first, second, and third AND circuits 165, 167, 169, input a reset signal (timing pulse TG) from the counter 153 and the control signal from the first register 155. Based on the reset signal and the control signal input, it is determined which CIS' 131a, 131b, and 131c can detect the signals. The amplifier 171 amplifies the signals detected by and output from any one of the CIS' 131a, 131b, 131c.

Image reading control operations in the electronic whiteboard 1 will be described below. In the electronic whiteboard 1, as the reset signal (timing pulse TG) is output from the counter 153, the first register 155 outputs a port selecting signal to, for example, the first AND circuit 165, so that signals from the CIS 131a can be detected. At this time, the second register 161 outputs a control signal, to the selector switch 149, to enable the input of the signals detected by and output from the CIS 131a to the ASIC 147. As a result, an image reading signal detected by each of the photo detectors of the CIS 131a, is input into the A/D converter 157 of the ASIC 147, via the amplifier 171. In the A/D converter 157, analog to digital conversion is carried out. The converted data is input to the binary circuit 159. The data input to the binary circuit 159 is binary-coded in comparison with a predetermined threshold value. The thus binary-coded image reading signals are input to the S/P converter 163 in which the image reading signals are converted into the parallel data. The parallel data is read by the CPU 141 and stored in the RAM 145.

Similarly, as the reset signal (timing pulse TG) is output from the counter 153, the first register 155 outputs the port selecting signal to, for example, the second AND circuit 167 so that signals from the CIS 131b can be detected. At this time, the second register 161 outputs the control signal to the selector switch 149, to enable the input of the signals, detected by and output from the CIS 131b, to the ASIC 147. As a result, the image reading signal detected by each of the photo detectors of the CIS 131b is input into the A/D converter 157 of the ASIC 147, via the amplifier 171. In the A/D converter 157, analog to digital conversion is carried out. The converted data is input to the binary circuit 159. The data input to the binary circuit 159 is binary-coded in comparison with a predetermined threshold value. The thus binary-coded image reading signals are input to the S/P converter 163 in which the image reading signals are converted into the parallel data. The parallel data is read by the CPU 141 and stored in the RAM 145.

Similarly, as the reset signal (timing pulse TG) is output from the counter 153, the first register 155 outputs the port selecting signal to, for example, the third AND circuit 169 so that signals from the CIS 131c can be detected. At this time, the second register 161 outputs the control signal to the selector switch 149 to enable the input of the signals detected by and output from the CIS 131c, to the ASIC 147.

As a result, the image reading signal detected by each of the photo detectors of the CIS 131c are input into the A/D converter 157 of the ASIC 147, via the amplifier 171. In the A/D converter 157, analog to digital conversion is carried out. The converted data is input to the binary circuit 159. The data input to the binary circuit 159 is binary-coded in comparison with a predetermined threshold value. The binary-coded image reading signals are input to the S/P converter 163 in which the image reading signals are converted into the parallel data. The parallel data is read by the CPU 141 and stored in the RAM 145. Similar to the first embodiment, the parallel data output from the S/P converter 163 may not be stored in the RAM 145, under the control of the CPU 141. In FIG. 6, the data represented by the hatched portions, is not stored in the RAM 145.

With the above-described control operations, the image reading signals detected by the CIS' 131a, 131b, and 131c, are stored in the RAM 145. One line of the data of the images written on the sheet member 11 is stored in the RAM 145. At this time, the CPU 141 stores in the RAM 145, as in the first embodiment, results of judgements made based on a table, such as shown in TABLE 1 above, as to the colors of each pixel of the image data. More specifically, the judgements are made as to which color, black, red, or white, each pixel of the image data corresponds, based on the color of LED light emitted when the image reading signal is obtained, and based on TABLE 1.

Referring to the timing chart shown in FIG. 6, the above-described control operations will be described. The CPU 141 controls the LEDs 133a, 133b, 133c so as to switch the emission of the green light and red light every approximately 8 msec (corresponding to five timing pulse outputs). In the LEDs 133b, 133c, the switching between the green light and red light is made at the same time. In the LED 133a, the switching between the green light and red light, is made approximately 1.6 msec (corresponding to one timing pulse output) earlier than the switching made in the LEDs 133b, 133c, as shown in FIG. 6. The CIS 131a is influenced by the lighting of the LED 133a, and the LED 133b adjacent thereto. The CIS 131b is influenced by the lighting of the LED 133b, and the LEDs 133a and 133c adjacent thereto. The CIS 131c is influenced by the lighting of the LED 133c, and the LED 133b adjacent thereto. In the second embodiment, the LEDs 133a, 133b, 133c are controlled in the following manner. As shown in FIG. 6, the period during which the LED 133a emits the green light overlaps with the period during which the LEDs 133b and 133c emit the green light. Similarly, the period during which the LED 133a emits the red light overlaps with the period during which the LEDs 133b and 133c emit the red light. The periods during which the LEDs 133b, 133c emit the green light or red light match completely.

As shown in FIG. 6, each of the CIS' 131a, 131b, 131c outputs the image reading signals, as the timing pulses TG are provided. As described above, the signals detected by and output from any one of the CIS' 131a, 131b, 131c, are input to the ASIC 147, with the aid of the selector switch 149. Such signals that are input from any one of the CIS' 131a, 131b, 131c, to the ASIC 147, are represented, in FIG. 6, by the white portions (non-hatched portions). The signals represented by the hatch portions are lost. More specifically, while one of the CIS 131a, 131b, or 131c outputs the effective image data, the other CIS 131a, 131b, and/or 131c lose the ineffective image data, that is, the image data produced with the insufficient electrical charge, and/or the image data with the electrical charge stored as influenced by both the red light and green light.

Taking the CIS 131a as an example, the signal represented by the non-hatched area is input to the ASIC 147. The succeeding two signals, each of which are represented by the hatched areas, have not yet received the light for 4.8 msec of the charging period so that the signals, represented by the hatched portions, are image data produced with the insufficient electrical charge.

In the second embodiment, the signals detected by and output from the CIS 131a, 131b, 131c, are input as the image reading signals, to the ASIC 147, at a timing such as shown in FIG. 6. The time required to read one line of the image data is approximately 16 msec.

As described above, in the electronic whiteboard 1 according to the second embodiment of the invention, the CIS unit 113 is divided into three parts in the direction of the length thereof. While the lighting of the divided three parts of the LEDs 133a, 133b, 133c is controlled as shown in FIG. 6, the image reading signals are detected by each of the divided three parts of the CIS 131a, 131b, 131c. Among the image reading signals detected by the CIS 131a, 131b, 131c, the signals represented by the hatched portions are lost. The switching is made by the selector switch 149, and the image reading signals from one of the CIS 131a, 131b, 131c are input to the ASIC 147. With the above-described construction and operation, the images written on the sheet member 11 may be read faster in the second embodiment than in the first embodiment, while the colors of the images written in black and red on the sheet member 11 are precisely identified. More specifically, in the first embodiment, it takes approximately 19.2 msec (4.8 msec×4) to read one line of image data. In the electronic whiteboard 1 according to the second embodiment of the invention, it takes approximately 16 msec to read one line of the image data. Therefore, the reduction in the image reading speed is approximately 17% (16/19.2 msec=0.83).

Although the invention has been described with reference to the first and second embodiments, it is to be understood that the invention is not restricted to the particular forms shown in the foregoing embodiments. Various modifications and alterations can be made thereto without departing from the scope of the invention.

For example, in the above-described embodiments, red and green LEDs are used. However, green and blue LEDs may be used to read images written in black and blue. Further, LEDs of three or more colors may be used to read multi-color images.

Although the above-described embodiments of the invention are explained, taking the electronic whiteboard as an example, the invention may be applied to a facsimile apparatus that may produce a print output of images written in red and black, by identifying the colors thereof.

In the second embodiment, the CIS unit is divided into three parts, in the direction of the length thereof. However, the CIS unit may be divided into two parts or four or more parts, other than three parts. Described below are other embodiments in which the CIS unit is divided in the direction of the length thereof, into "n" parts, as well as two and four parts.

In a third embodiment, the image reading of text/graphics written on the sheet member 11, using a CIS unit 213 including a CIS 231 and a LED 233, which is divided into "n" parts ("n" is an integer equal to or greater than 2).

Figure 7B:
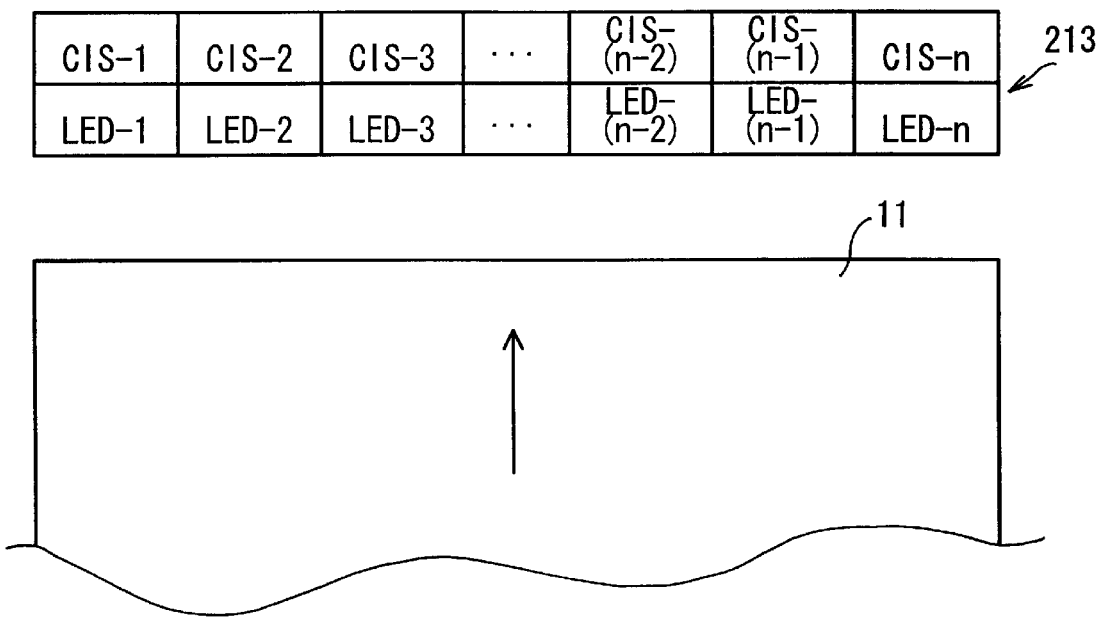
FIG. 7B is a schematic illustration of a contact image sensor unit in an electronic whiteboard according to a third embodiment of the invention.
Figure 8:
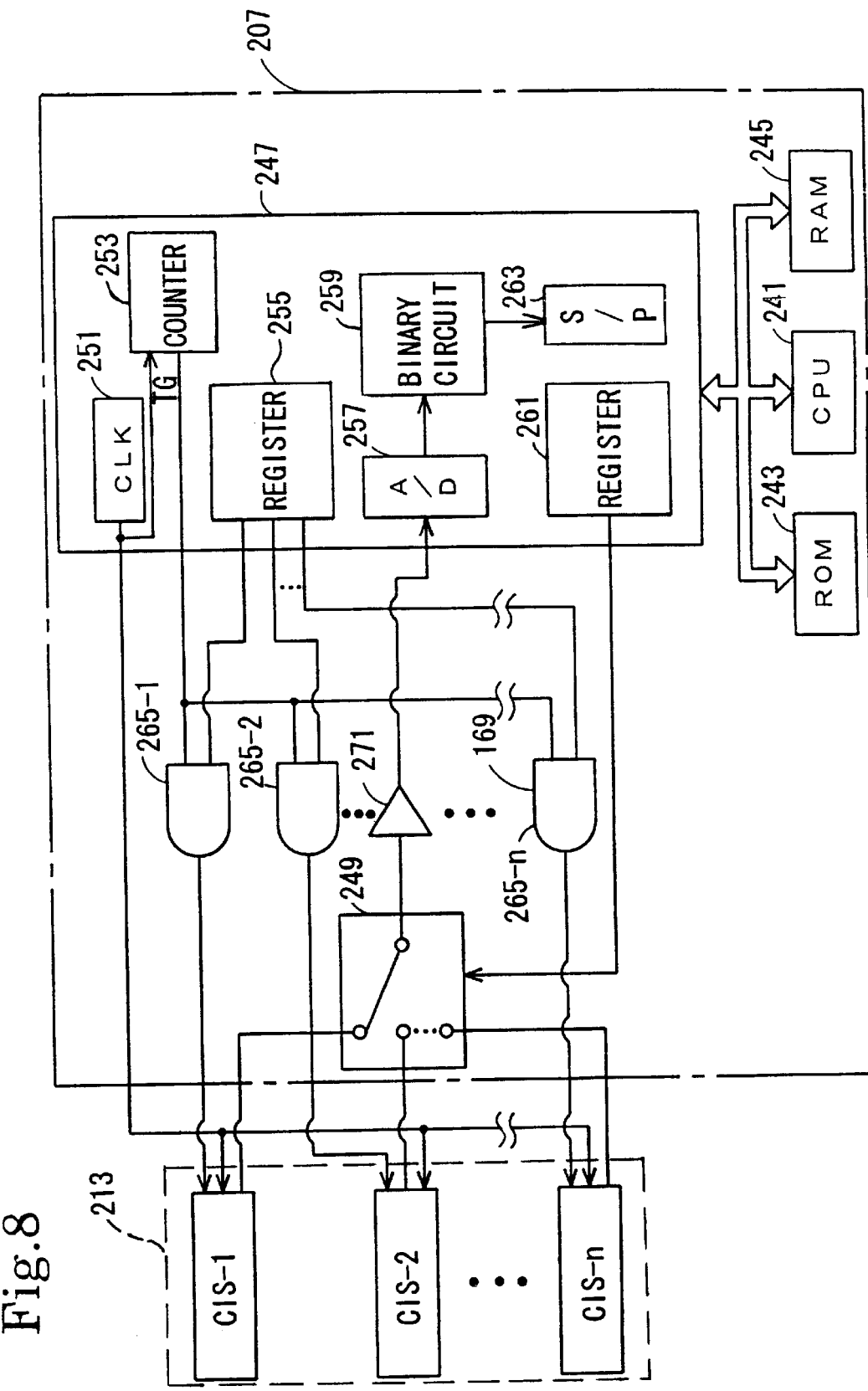
FIG. 8 is a block diagram of an input system for an image reading signal in an electronic whiteboard according to the third embodiment of the invention.

FIG. 8 is a block diagram of an input system for a signal of images read by the CIS unit 213, which is divided into "n" parts. The CIS unit 213 includes a CIS-1, a CIS-2, . . . , a CIS-n, a LED-1, a LED-2, . . . , and a LED-n, as shown in FIG. 7B. Each divided part of the CIS has the charging period of 4.8 msec.

When the CIS unit 213 is divided into "n" parts ("n" is an integer equal to or greater than 2), an interval at which the timing pulses TG are output by the counter 253 is given by the following formula:

$$TG = Tc/n$$

where Tc is the charging period of the CIS unit.

A light emitting cycle of the LED for each color of light, is given by the following formula:

$$\begin{aligned} TL &= \{n + (n-1)\} \times TG \\ &= \{n + (n-1)\} \times Tc/n \\ &= (2n-1) \times Tc/n \\ &= Tc \times (2 - 1/n) \end{aligned}$$

The time TR required to read one line of the image data when the CIS unit 213 is divided into "n" parts is given by the following formula:

$$\begin{aligned} TR &= 2 \times TL \\ &= 2 \times Tc \times (2 - 1/n) \end{aligned}$$

As will be understood by the formula, the reduction in the image reading speed for one line is achieved by the use of a CIS with the shorter charging period, and by selecting a smaller number for "n". As "n" becomes larger, the image reading time for one line becomes longer.

An input system of a main controller 207 will be described below. The main controller 207 includes a CPU 241, a ROM 243, a RAM 245, an ASIC 247, and a selector switch 249 that switches signals detected by and output from a CIS-1, a CIS-2, . . . and a CIS-n.

The ASIC 247 includes a clock 251, a counter 253, a first register 255, an A/D (analog-to-digital) converter 257, a binary circuit 259, a second register 261, and a S/P (serial-to-parallel) converter 263. The clock 251 generates clock signals at intervals of 2 msec. The clock signals are input to CIS-1 through CIS-n, as well as the counter 253. The counter 253 provides timing pulses TG, to CIS-1 through CIS-n and the CPU 241. The counter 253 is constructed so as to repeat the operations of resetting every 4.8 msec/(n·2 microseconds)=2400/n counts kept in synchronization with the clock signals generated by the clock 251 and outputting the timing pulses TG. More specifically, the counter 253 outputs the timing pulses TG every 2 microseconds×2400/n=4.8/n (msec). The first register 255 has "n" ports. The first register 255 outputs a control signal to determine which CIS-1 to CIS-n can detect signals. The A/D converter 257 converts analog signals, which are input from CIS-1 to CIS-n, via the selector switch 249, into digital signals. The binary circuit 259 binary-codes the image data, based on the signals output from the A/D converter 257. The second register 261 is a port to provide switching timing, to the selector switch 249, approximately every 4.8/n msec. The switching timing is provided by the CPU 241. The S/P converter 263 converts serial signals output from the binary circuit 259 into parallel signals and outputs the converted signals to the CPU 241 via a bus.

The main controller 207 includes a first AND circuit 265-1, an "n"th AND circuit 265-n, and an amplifier 271. The first to "n"th AND circuits 265-1 to 265-n input a reset signal from the counter 253 and the control signal from the first register 255. Based on the reset signal and the control signal input, it is determined which CIS-1 to CIS-n can detect the signals. The amplifier 271 amplifies the signals detected by and output from CIS-1 to CIS-n.

Figure 7C:
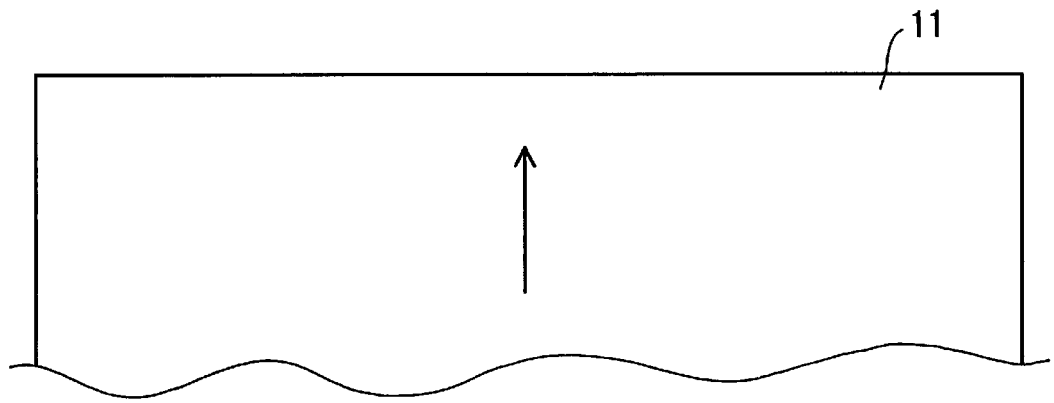
FIG. 7C is a schematic illustration of a contact image sensor unit in an electronic whiteboard according to a fourth embodiment of the invention.

The third embodiment is described above in which the CIS unit 213 is divided into "n" parts, in the direction of the length thereof. Described below is a fourth embodiment in which the CIS unit is divided into two parts (n=2) in the direction of the length thereof. As shown in FIG. 7C, the CIS unit includes a CIS-1, a CIS-2, a LED-1, and a LED-2.

Figure 9:
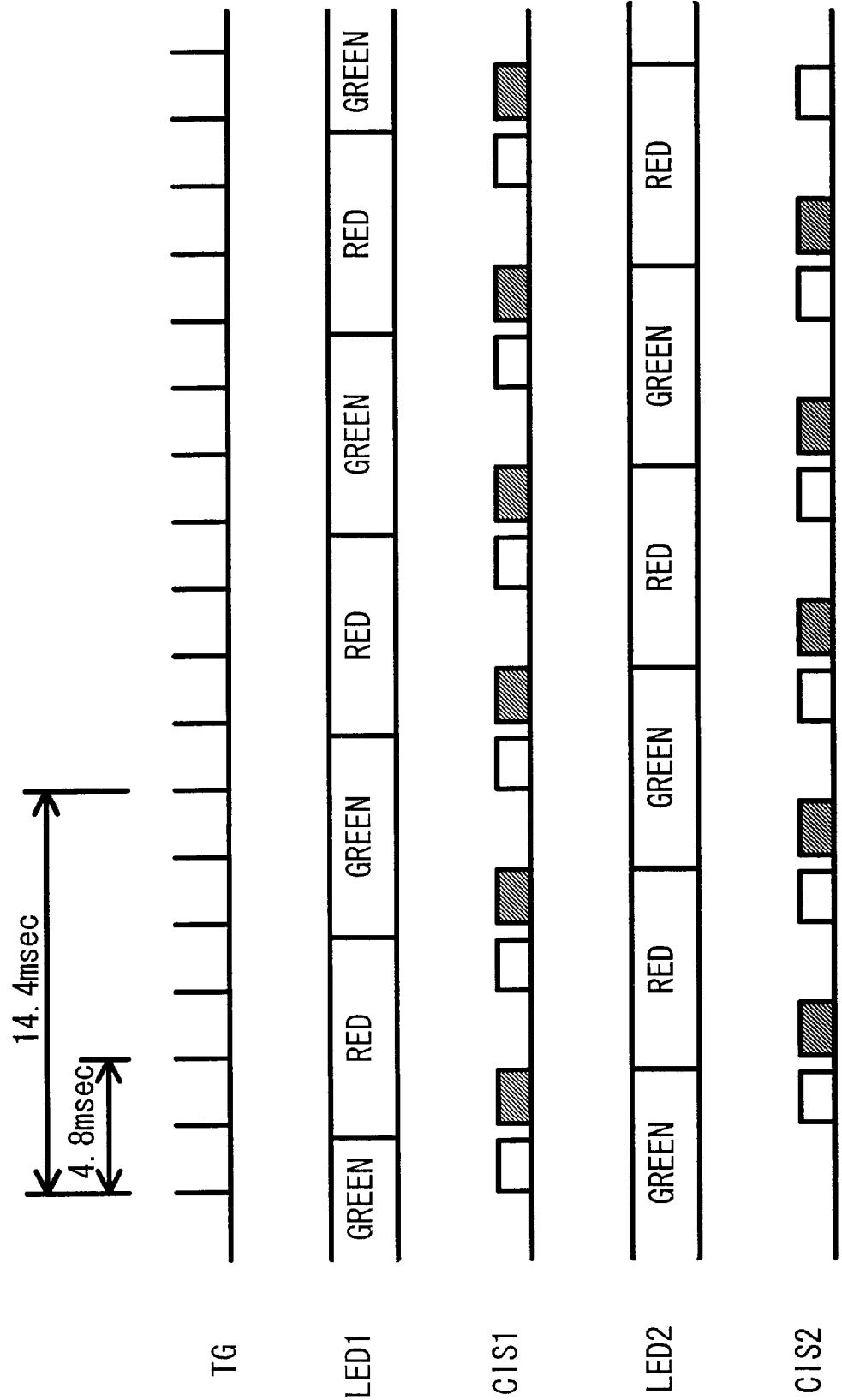
FIG. 9 is a timing chart illustrating image reading control operations to be performed in the electronic whiteboard according to the fourth embodiment of the invention.

As shown in FIG. 9, the timing pulses TG are output from the counter 253, every 2.4 msec (4.8/n=4.8/2=2.4). Accordingly, the counter 253 is constructed so as to repeat the operations of resetting every 1200 counts (2400/n=2400/2=1200) kept in synchronization with the clock signals generated at intervals of 2 microseconds, by the clock 251, and outputting the timing pulses TG. The first register 255 may have two ports. Two AND circuits may be provided. The selector switch 249 may conduct the switching of signals detected by and output from the CIS-1 and the CIS-2.

FIG. 9 shows a timing chart for the image reading control operations to be performed when the CIS unit is divided into two parts (n=2), in the direction of the length thereof. As will be understood in FIG. 9, the time required to read one line of the image data is approximately 14.4 msec. Therefore, the reduction in the image reading speed is 25% (14.4/19.2=0.75).

Figure 7D:
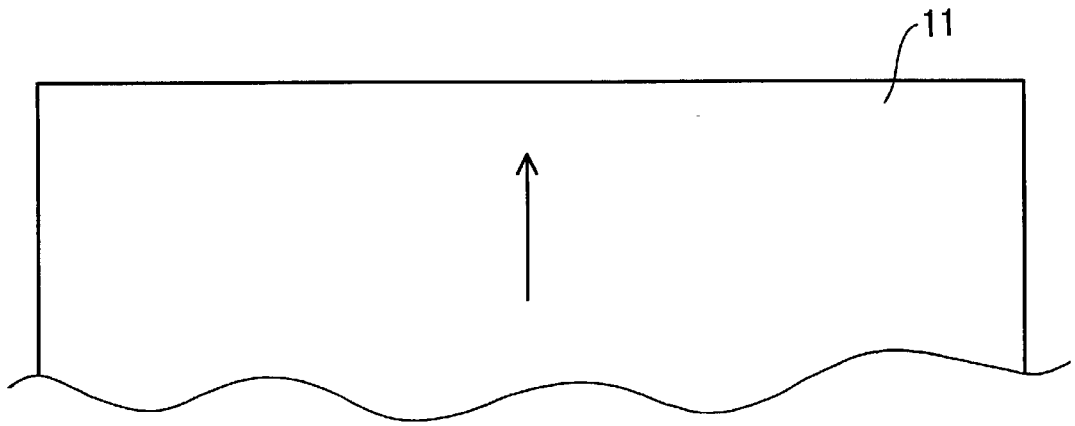
FIG. 7D is a schematic illustration of a contact image sensor unit in an electronic whiteboard according to a fifth embodiment of the invention.
Figure 10:
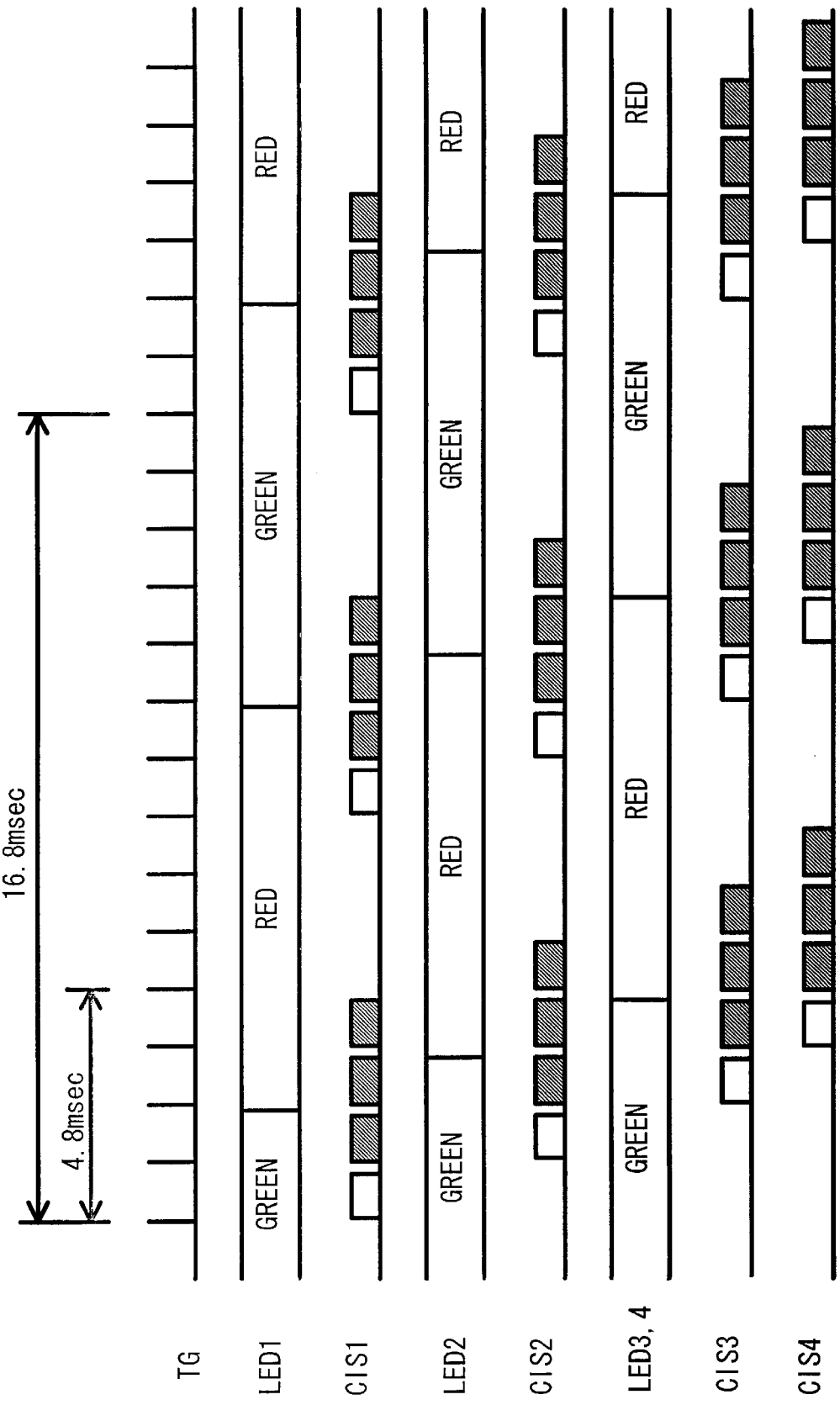
FIG. 10 is a timing chart illustrating image reading control operations to be performed in the electronic whiteboard according to the fifth embodiment of the invention.

Described below is a fifth embodiment in which the CIS unit is divided into four (n=4), in the direction of the length thereof. As shown in FIG. 7D the CIS unit includes CIS-1 to CIS-4 and LED-1 to LED-4. As shown in FIG. 10, the timing pulses TG are output from the counter 253 every 1.2 msec (4.8/n=4.8/4=1.2). Accordingly, the counter 253 is constructed so as to repeat the operations of resetting every 600 counts (2400/n=2400/4=600) kept in synchronization with the clock signals generated at intervals of 2 microseconds, by the clock 251, and outputting the timing pulses TG. The first register 255 may have four ports. Four AND circuits may be provided. The selector switch 249 may conduct the switching of signals detected by and output from the CIS-1 to the CIS-4.

FIG. 10 shows a timing chart for the image reading control operations to be performed when the CIS unit is divided into four parts (n=4), in the direction of the length thereof. As will be understood in FIG. 10, the time required to read one line of the image data is approximately 16.8 msec. Therefore, the reduction in the image reading speed is approximately 13% (16.8/19.2=0.875).

In the above-described embodiments, a LED that emits, in turn, red light and green light is used. However, two separate LEDs, that is, one that emits only red light and another that emits only green light may be used.

What is claimed is:

1. An image reading device that reads an image written in at least two colors on a writing surface, by identifying the colors of the image, comprising:

a contact image sensor provided with photo detectors corresponding to a number of pixels, for reading the image written on the writing surface, the contact image sensor having a predetermined charging period;

a first light-emitting device that emits a first color of light at an image reading position on the writing surface;

a second light-emitting device that emits, at an image reading position on the writing surface, a second color of light different from the first color of light;

an image data output device that outputs the image written on the writing surface, as image data, by identifying the colors of the image, based on the image data read by the contact image sensor, while the first light-emitting device and the second light-emitting device are, in turn, turned on; and an image reading control device that operates the image data output device, so as to lose a first image data and to adopt a second image data, when each of the photo detectors of the contact image sensor reads the image as the image data by storing an electrical charge while either one of the first light-emitting device and the second light-emitting device emits a corresponding one of the first color of light or the second color of light.

2. The image reading device according to claim 1, wherein the first image data includes image data read when a color of light emitted from one light-emitting device is changed to a different color of light emitted from the other light-emitting device, while each of the photo detectors stores the electrical charge for the predetermined charging period.

3. The image reading device according to claim 1, wherein the first image data includes image data obtained with each of the photo detectors which has not stored the electrical charge for the predetermined charging period.

4. The image reading device according to claim 1, wherein the second image data includes image data obtained with each of the photo detectors storing the electrical charge for the predetermined charging period, with only a color of light emitted either from the first light-emitting device or the second light-emitting device.

5. The image reading device according to claim 1, wherein the contact image sensor, the first light-emitting device, and the second light-emitting device are divided into a plurality of parts in a direction of a length thereof.

6. The image reading device according to claim 5, wherein the image reading control device operates the plurality of parts of the contact image sensor in a predetermined order, and operates the plurality of parts of the contact image sensor so as to lose the image data which is output, while one part of the contact image sensor performs an effective reading by other parts of the contact image sensor, and executes a reading of the image written on the recording medium by overlapping periods of image reading by each of the plurality of parts of the contact image sensor.

7. The image reading device according to claim 6, wherein the image reading control device operates the plurality of parts of the first light-emitting device and the second light-emitting device in a predetermined order so as to overlap periods during which parts of the first light-emitting device and the second light-emitting device, adjacent to each other in the direction of the length thereof, emit a same color of light, and operates the plurality of parts of the contact image sensor so as to read the image written on the recording medium, while losing the image data obtained under an influence of light emitted from both the first light-emitting device and the second light-emitting device.

8. The image reading device according to claim 7, wherein the image reading control device overlaps the periods during which the parts of the first light-emitting device and the second light-emitting device, adjacent to each other in a direction of the length thereof, emit the same color of light, in order to charge each of the photo detectors of the contact image sensor with the same color of light for the predetermined charging period.

9. The image reading device according to claim 8, wherein the contact image sensor, the first light-emitting device, and the second light-emitting device are divided into "n" parts, "n" is an integer equal to or greater than two, a light emitting cycle TL of each part of the first light-emitting device and the second light-emitting device, is given by:

$$TL = Tc \times (2 - 1/n),$$

where Tc is the charging period, and a time TR required to read one line of the image data is given by:

$$TR = 2 \times TL.$$

10. The image reading device according to claim 9, wherein when the "n" is equal to two, the image reading control device turns on/off the first light-emitting device and the second light-emitting device in a cycle of $3Tc/2$, and turns on/off one part of the first light-emitting device and the second light-emitting device $Tc/2$ earlier than the other part of the first light-emitting device and the second light-emitting device.

11. The image reading device according to claim 9, wherein when the "n" is equal to or greater than three, and the first light-emitting device and the second light-emitting device are turned on in the predetermined order, the image reading control device simultaneously turns on/off last two parts thereof.

12. The image reading device according to claim 11, wherein the image reading control device turns on/off the plurality of parts of the first light-emitting device and the second light-emitting device, at a timing such that $Tc/n$ is later than a previously light emitting part thereof.

13. An image reading device that reads an image written in at least two colors on a writing surface, by identifying the colors of the image, comprising:

a contact image sensor provided with photo detectors corresponding to a number of pixels, for reading the image written on the writing surface, the contact image sensor being divided into a plurality of parts in a direction of a length thereof, the contact image sensor having a predetermined charging period;

a first light-emitting device that emits a first color of light, at an image reading position on the recording medium, the first light-emitting device being divided into a plurality of parts in a direction of a length thereof;

a second light-emitting device that emits a second color of light, at an image reading position on the recording medium, the second light-emitting device being divided into a plurality of parts in a direction of a length thereof;

an image data output device that outputs the image written on the recording medium, as image data, by identifying the colors of the image, based on a first image data started to be read by the contact image sensor during emission of the first color of light from the first light-emitting device, and a second image data started to be read by the contact image sensor during emission of the second color of light from the second light-emitting device, as the first light-emitting device and the second light-emitting device are, in turn, turned on; and an image reading control device that operates the plurality of parts of the contact image sensor, in a predetermined order, and operates the plurality of parts of the contact image sensor so as to lose the image data which is output, while each of the plurality of parts of the contact image sensor performs an effective reading by other parts of the contact image sensor;

wherein the image reading control device executes a reading of the image written on the recording medium by overlapping periods of image reading by each of the plurality of parts of the contact image sensor.

14. The image reading device according to claim 13, wherein the image reading control device operates the plurality of parts of the first light-emitting device and the second light-emitting device in a predetermined order, so as to overlap periods during which parts of the first light-emitting device and the second light-emitting device, adjacent to each other in the direction of the length thereof, emit a same color of light, and operates the plurality of parts of the contact image sensor so as to read the image written on the writing surface, while losing the image data obtained under an influence of both light emitted from the first light-emitting device and the second light-emitting device.

15. The image reading device according to claim 14, wherein the image reading control device overlaps the periods during which the parts of the first light-emitting device and the second light-emitting device, adjacent to each other in a direction of the length thereof, emit the same color of light, in order to charge each of the photo detectors of the contact image sensor with the same color of light for the predetermined charging period.

16. An electronic whiteboard, comprising:

a whiteboard;

a contact image sensor provided with photo detectors corresponding to a number of pixels, for reading the image written on the whiteboard, the contact image sensor being divided into a plurality of parts in a direction of a length thereof, the contact image sensor having a predetermined charging period;

a first light-emitting device that emits a first color of light at an image reading position of the whiteboard, the first light-emitting device being divided into a plurality of parts in a direction of a length thereof;

a second light-emitting device that emits a second color of light at an image reading position of the whiteboard, the second light emitting device being divided into a plurality of parts in a direction of a length thereof;

an image data output device that outputs the image written on the whiteboard, as image data, by identifying the colors of the image, based on a first image data started to be read by the contact image sensor, during emission of the first color of light from the first light-emitting device, and a second image data started to be read by the contact image sensor, during emission of the second color of light from the second light-emitting device, as the first light-emitting device and the second light-emitting device, are in turn, turned on; and a multi-color thermal printing device that produces the image written on the whiteboard on multi-color heat-sensitive paper that produces at least two colors thereon, according to an amount of heat applied thereto, by applying heat to the multi-color heat-sensitive paper, based on the image data output by the image data output device; and an image reading control device that operates the plurality of parts of the contact image sensor, in a predetermined order, and operates the plurality of parts of the contact image sensor so as to lose the image data which is output, while each of the plurality of parts of the contact image sensor performs an effective reading by other parts of the contact image sensor, wherein the image reading control device executes a reading of the image written on the recording medium by overlapping periods of image reading by each of the plurality of parts of the contact image sensor.

17. The electronic whiteboard according to claim 16, wherein the image reading control device operates the plurality of parts of the contact image sensor in a predetermined order, and operates the plurality of parts of the first light-emitting device and the second light-emitting device in a predetermined order so as to overlap periods during which parts of the first light-emitting device and the second light-emitting device, adjacent to each other in the direction of the length thereof, emit a same color of light, and operates the plurality of parts of the contact image sensor so as to read the image written on the recording medium while losing the image data obtained under an influence of light emitted from both first light-emitting device and the second light-emitting device.

18. The electronic whiteboard according to claim 17, wherein the image reading control device overlaps the periods during which the parts of the first light-emitting device and the second light-emitting device, adjacent to each other in a direction of the length thereof, emit the same color of light, in order to charge each of the photo detectors of the contact image sensor with the same color of light for the predetermined charging period.

19. An image reading device that reads an image written in at least two colors on a writing surface, by identifying the colors of the image, comprising:

a contact image sensor provided with photo detectors corresponding to a number of pixels for reading the image written on the writing surface, the contact image sensor being divided into "n" parts ("n" is an integer equal to or greater than two) in a direction of a length thereof, the contact image sensor having a predetermined charging period Tc;

a first light-emitting device that emits a first color of light at an image reading position on the recording medium, the first light-emitting device being divided into "n" parts in a direction of a length thereof;

a second light-emitting device that emits a second color of light at an image reading position on the recording medium, the second light-emitting device being divided into "n" parts in a direction of a length thereof;

an image data output device that outputs the image written on the recording medium, as image data, by identifying the colors of the image, based on a first image data started to be read by the contact image sensor during emission of the first color of light from the first light-emitting device, and a second image data started to be read by the contact image sensor during emission of the second color of light from the second light-emitting device, as the first light-emitting device and the second light-emitting device, are in turn, turned on, approximately every $Tc \times (2-1/n)$; and an image reading control device that operates the plurality of parts of the contact image sensor, in a predetermined order, and operates the plurality of parts of the contact image sensor so as to lose the image data which is output while each of the plurality of parts of the contact image sensor performs an effective reading by other parts of the contact image sensor, wherein the image reading control device executes a reading of the image written on the recording medium by overlapping periods of image reading by each of the plurality of parts of the contact image sensor, thereby controlling an image reading speed for one line to be approximately $2 \times Tc \times (2-1/n)$.

20. An image reading device that reads an image written in at least two colors on a writing surface, by identifying the colors of the image, comprising:

a contact image sensor provided with photo detectors corresponding to a number of pixels for reading the image written on the writing surface, the contact image sensor outputting image data by each of the photo detectors' storing an electrical charge for a predetermined period, the contact image sensor being divided into a plurality of parts in a direction of a length thereof;

a first light-emitting device that emits a first color of light at an image reading position on the recording medium, the first light-emitting device being divided into a plurality of parts in a direction of a length thereof;

a second light-emitting device that emits a second color of light at an image reading position on the recording medium, the second light-emitting device being divided into a plurality of parts in a direction of a length thereof;

an image data output device that outputs the image written on the recording medium, as the image data, by identifying the colors of the image, based on the image data read by the contact image sensor, while the first light-emitting device and the second light-emitting device, are in turn, turned on; and an image reading control device that operates the image data output device, so as to adopt the image data read with each of the photo detectors of the contact image sensor storing the electrical charge for the predetermined period, while either one of the first light-emitting device and the second light-emitting device emits corresponding to the first color of light or the second color of light, and to lose the image data read with each of the photo detectors which has not stored the electrical charge for the predetermined period.

* * * * *